May 27, 1969

V. H. HAASE 3,445,968

PIVOTAL MOUNTING FOR THE CUTTING HEAD
OF A MASONRY OR METAL SAW

Filed Nov. 29, 1966

INVENTOR.
Victor H. Haase.
BY
Paul E. Mullendore
ATTORNEY.

INVENTOR.
Victor H. Haase.
BY
Paul E. Mullendore
ATTORNEY

United States Patent Office 3,445,968
Patented May 27, 1969

3,445,968
PIVOTAL MOUNTING FOR THE CUTTING HEAD OF A MASONRY OR METAL SAW
Victor H. Haase, Grandview, Mo., assignor to Robert G. Evans Company, Kansas City, Mo., a corporation of Missouri
Filed Nov. 29, 1966, Ser. No. 597,734
Int. Cl. B24b 7/00, 9/00
U.S. Cl. 51—99                   5 Claims

ABSTRACT OF THE DISCLOSURE

A bearing means for positively clamping and retaining a pivoted cutting head of a machine of the type used in cutting masonry, tile, brick, metals, and the like, for easy removal and replacement of the head on the frame of the machine and for retaining the head with the abrasive disk firmly in alignment with the cut to be made while the head is pivoted thereon to bring the abrasive disk into and out of contact with the work.

BACKGROUND OF THE INVENTION

Masonry and similar cutoff machines generally include a frame carrying a track on which a work table is reciprocally supported to bring the work into contact with the abrasive disk of the machine.

The abrasive disk is rotatably mounted on a pivoted head that also carries the motor, motor circuitry, and automatic controls which prevent the motor from being overloaded and the abrasive disk from being damaged by forcing it into the work.

For easy transportation of the machine from one job to another, the cutting head is demountable as a unit from the rest of the machine and replaceable on the machine when the work is to start. Since the cutting head is readily removable, the head and parts thereof, and the abrading disk, offer temptation to thieves and meddlers at the end of the day, and it is desirable to remove the head from the machine so that it may be locked up in a tool shed at the site of the job.

In most machines of this type, the cutting head is merely saddled to pivot on a shaft on the frame of the machine, or a shaft carried on the head is merely set into seats or notches of the frame. Consequently, the parts fit relatively loosely and poor alignment results because of considerable play. Besides, the head is apt to jump out of its support, causing poor cuts, breakage of the abrading disk, and other hazards. In some machines attempts have been made to latch the pivot shaft in its seat, but this does not correct alignment, breakage, or play which prevents a smooth, accurate cut into the work. Also, the latches are usually concealed and in a position where they are not easily accessible. Their effectiveness is not always maintained.

SUMMARY OF THE INVENTION

Therefore, this invention is to provide an improved pivotal mounting of the cutting head on the supporting structure of such machines, that retains the head firmly in its operative position, thereby greatly improving the sawing or cutting action of the machine and which is easily releasable to remove the head from the machine when desired. It is also an object of the invention to provide antifriction bearings on which the head pivots and which are firmly clamped into seats on the head supporting member of the frame, as illustrated in the accompanying drawings, wherein.

DESCRIPTION OF THE PREFERRED EMBODIMENT

Figure 1:
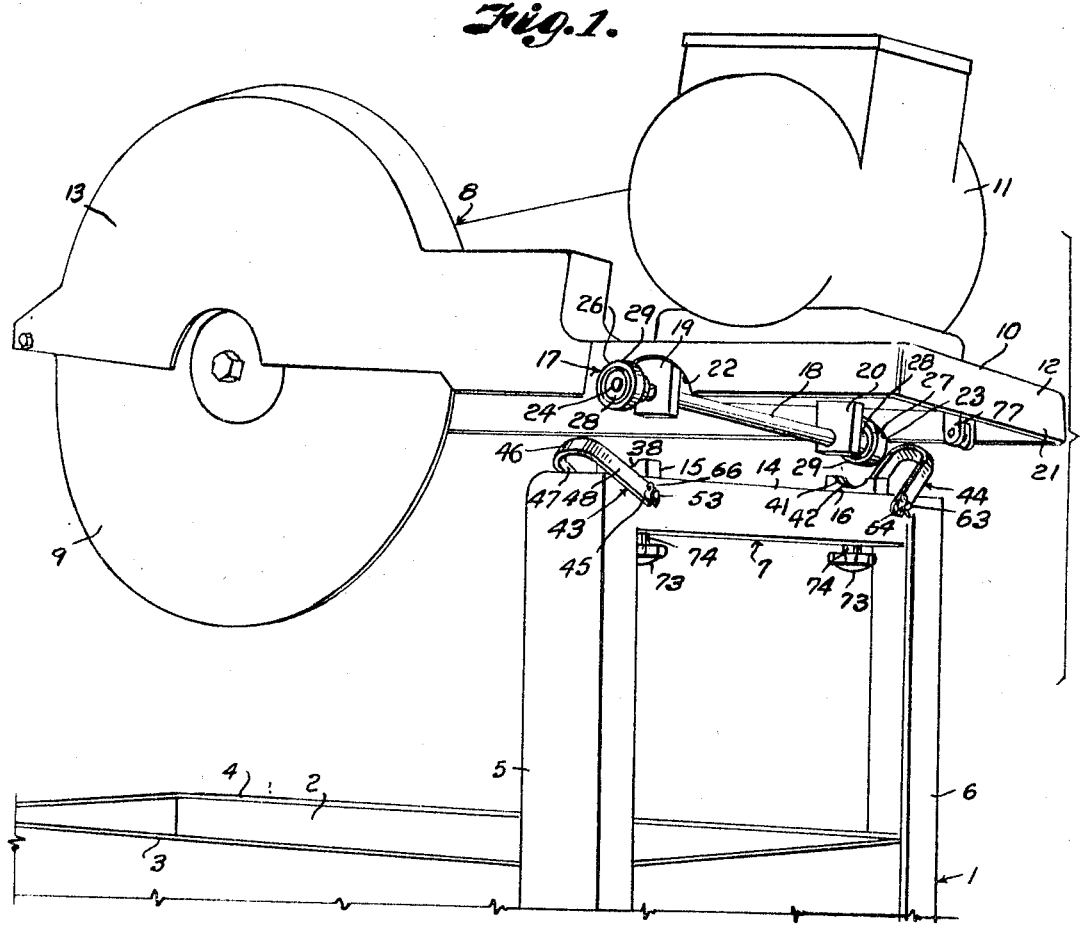
FIG. 1 is a partial perspective view of a masonry or metal saw, illustrating the cutting head assembly about to be mounted on its support that is carried by the framework of the machine for pivotal mounting of the head on a transverse axis.

Referring more in detail to the drawings:
1 designates a table-like frame that includes a substantially horizontal pan-like top 2 that is of substantially elongated shape, with the longer sides extending in a fore-and-aft direction to provide tracks 3 and 4 for a reciprocatory workcart, not shown. The pan-like top 2 is supported at the front and rear corners by legs, of which only the rear legs 5 and 6 appear in the drawings. The rear legs 5 and 6 extend above the tracks 3 and 4 of the top 2 to carry a supporting means 7 on which a cutting head 8 is adapted to pivot or rock to bring an abrading disk or saw 9 into contact with the work carried on the cart, not shown.

Figure 2:
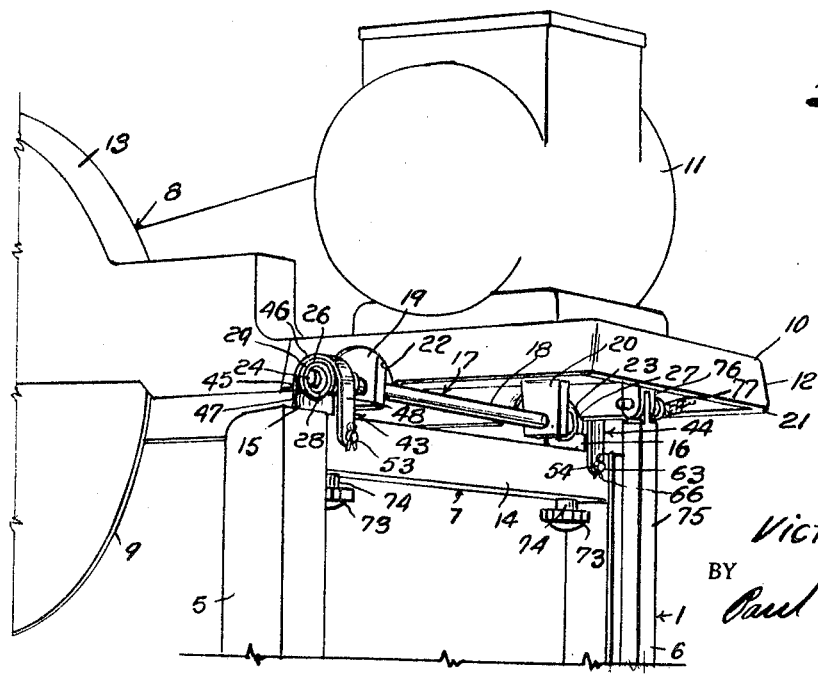
FIG. 2 is a similar view, but showing the cutting head assembly in mounted position with the pivotal means therefor anchored to its support on the frame of the machine.
Figure 3:
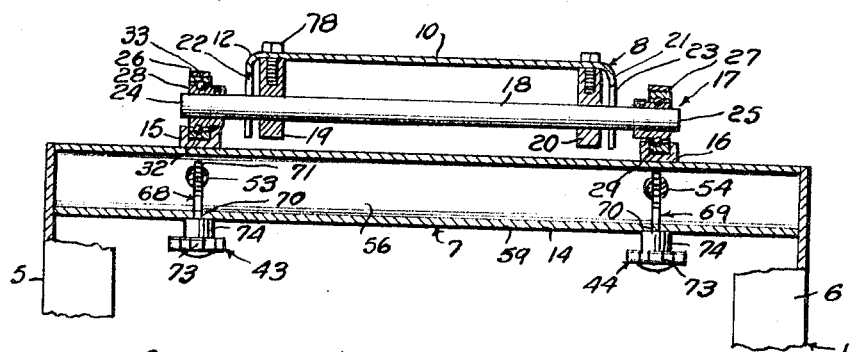
FIG. 3 is a transverse vertical section at the pivotal axis of the head.

The cutting head includes a platform 10 having a motor and control assembly 11 mounted on its rear end 12 and the abrasive disk 9 rotatably mounted on its forward end 13. The abrasive disk is driven by the motor assembly. In the machine illustrated, the supporting means 7 may be vertically adjustable relatively to the rear legs 5 and 6 to accommodate the cutting disk to different heights of workpieces when they are carried upon the cart, or, when adjustability for height is not desired, the support may comprise a bar 14 welded between the legs 5 and 6, as illustrated in FIGS. 1, 2 and 3. In either event, the support 7 carries laterally spaced seat members 15 and 16 for mounting a pivoting means 17 whereon the cutting head is pivotally supported, as now to be described.

The pivoting means 17 includes a transverse shaft 18 having its ends carried in lugs 19 and 20 fixed to and depending from the under side of the platform 10 just inside of the guard flange 21 therefor, and which guard flange is provided with relatively large notches 22 and 23 for freely passing projecting ends 24 and 25 of the shaft 18, to mount bearings 26 and 27 in position for engaging in the seat members 15 and 16.

The bearings may include journal members 28 fixed to the ends of the shaft and oscillatable in outer members 29 that engage in the seat members 15 and 16. In the illustrated instance, the journal members 28 include inner annular grooves 31 for antifriction bearings 32. The antifriction bearings also engage in grooves 33 of the outer members 29. The bearings also preferably have seals 32' to exclude sludge and other foreign matter from the antifriction balls 32 and their races. Consequently, wear on the bearings and races is reduced to a minimum and the proper pivoting action is maintained. The journals or inner races 28 have hub portions 35 carrying set screws 36 by which they are fixed to the shaft 18, as best shown in FIG. 5.

Figure 6:
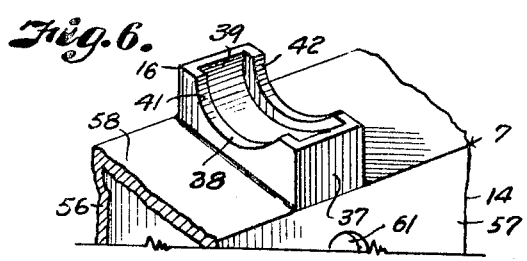
FIG. 6 is a perspective view of a portion of the pivot supporting means and one of the bearing seats thereon.

One of the seat members 15 or 16 is best illustrated in FIG. 6, which shows them as being provided by lugs 37 extending transversely of the bar 14 and which may be fixed thereto by welding. The lugs 37 have arcuate recesses 38 for passing the shaft 18 and hub portions 35. The lugs are further provided with counter-recesses 39 having a radius corresponding to the radius of the outer faces 40 of the outer race members 29. Flanges 41 and 42 are thus provided on the seat members to prevent longitudinal movement of the shaft 18, while the counter-recesses 39 snugly retain the bearings from movement in a fore-and-aft direction in the seats.

In order to clamp the outer race members 29 of the bearings 26 and 37 in the seat members 15 and 16 to prevent play of the shaft 18, hold-down means 43 and 44 are provided for the bearings, as now to be described.

Figures 4, 5:
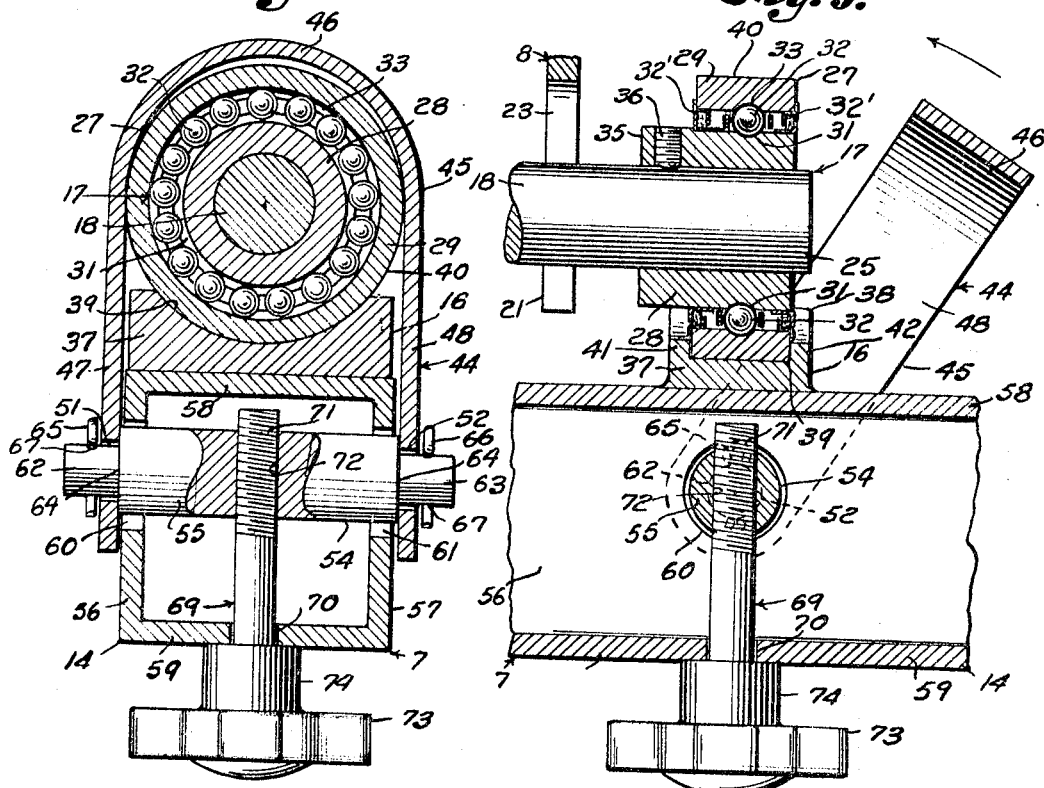
FIG. 4 is an enlarged vertical section through one of the bearings and hold-down means therefor, just prior to tightening of the jackscrew of the clamp.
FIG. 5 is a section through the bearing and its hold-down mechanism, taken at right angles to the section of FIG. 4 and showing the clamp being moved to engage the outer race of the bearing.

Each hold-down means includes a clevis shaped strap 45 having a curved portion 46 adapted to engage over the outer races of the bearings, as shown in FIG. 4. The clevis also includes depending legs 47 and 48 having ends provided with openings 51 and 52 to connect with transverse hinge pins 53 and 54 for the respective hold-down means. The hinge pins are best shown in FIGS. 4 and 5, and include cylindrical portions 55 that are loosely mounted in the transverse bar 14. In order to facilitate mounting of the hinge pins 53 and 54, the bar 14 is preferably a tube which may be of rectangular cross section to provide side wall portions 56 and 57 connected by top and bottom wall portions 58 and 59, the seat members being welded to the top wall portion 58. The side wall portions 56 and 57 have relatively large openings 60 and 61 below the seat members 15 and 16 for loosely passing the ends of the cylindrical portions 55 of the hinge pins 53 and 54, so that the hinge pins can be drawn toward the bottom wall 59. Provided on each end of the cylindrical portions 55 of the hinge pins are reduced trunnions 62 and 63 to pass through the openings 51 and 52 in the ends of the legs 47 and 48 of the clevises 45, as shown in FIG. 4. The legs of the clevises are retained against shoulders 64 (FIG. 4) by cotter pins 65 and 66 extending through openings 67 in the trunnions on the outer sides of the legs of the clevis members.

The clevis members are thus adapted to swing with the curved portions 46 thereof passing over the outer races of the bearings, or to swing outwardly from such position, as shown in FIGS. 1 and 5, to permit removal of the cutting head assembly, and it is obvious that by drawing downwardly on the hinge pins 53 and 54, the clevis members can retain the outer bearing races tightly in the seat members 15 and 16 (FIG. 3). This is accomplished by jackscrews 68 and 69 journaled in threaded openings 70 in the bottom wall portion 59 of the bar 14, and which have threaded shanks 71 engaging within threaded openings 72 in the cylindrical portion 55 of the hinge pins 53 and 54. The lower ends of the shanks 71 of the jackscrews have knobs 73 providing collar portions 74 adapted to engage the outer face of the bottom wall when the knobs 73 are turned to screw the shanks 71 into and from the threaded openings 72.

The cutting head 8 is rocked on the pivot means 17 by a rod 75 having its lower end connected with a suitable actuator (not shown), and which in some machines may be a foot pedal and in others a screw actuated crank. The upper end of the rod 75 is removably connected with a lug 76 which depends from the under side of the platform 10, the connection being established by a captive pin 77 (see FIG. 2).

In assembling the hold-down means 43 and 44 on the bar 14, the hinge pins 53 and 54 are inserted in the openings 60 and 61 so that the trunnions 62 and 63 project equally from the side walls 56 and 57 of the bar 14. The threaded openings 72 now align with the openings 70 so that the shanks 71 of the jackscrews 68 and 69 can be inserted and threaded into the hinge pins. The hinge pins 53 and 54, as well as the jackscrews, are now captives within the bar 14. The legs 47 and 48 are set astride the bar 14 and sprung apart so that the ends thereof slide over the ends of the trunnions 62 and 63 of the hinge pins 53 and 54. As soon as the openings 51 and 52 register with the trunnions 62 and 63, the springlike action of the metal in the clevis members brings the legs into engagement with the shoulders 64. The cotter pins 65 and 66 are inserted in the holes 67 of the trunnions 62 and 63 to retain the clevis members on the trunnions for swinging movement. The shaft 18 is fixed to the lugs 19 and 20 and the lugs are welded in place thereon. The lugs 19 and 20 are secured against the under side of the platform 10 by fastening devices such as screws 78 (FIG. 3). The bearings 26 and 27 are slid onto the ends 24 and 25 of the shaft 18. When they engage in the recesses of the seat members 15 and 16, the set screws 36 are tightened against the shaft. The hold-down means is now a part of the supporting means 7, while the pivoting means 17 is carried by the cutting head assembly 8.

In applying the cutting head assembly 8, the clevis members 43 and 44 are swung to an out-of-way position, as shown in FIGS. 1 and 5. The cutting head assembly 8 is then lowered therebetween to seat the bearings 26 and 27 in the recesses of the seat members 15 and 16, with the outer members 29 of the bearings engaging between the flanges 41 and 43 of the seat members. Since the clevis members of the hold-down means 43 and 44 are loose within the openings 60 and 61, the curved portions 46 of the clevis members can be easily brought over the outer members 40 of the bearing means (see FIG. 4). The jackscrews 68 and 69 are turned in the threaded openings 72 of the hinge pins in a direction to draw the curved portions 46 of the saddle members tightly against the faces 40 and the faces 40 into tight contact with the arcuate face of the counter-recesses 39 of the seat members.

The cutting head assembly is now firmly, but pivotally, mounted, with the journals 28 of the bearings 26 and 27 turning freely within the outer members by reason of the antifriction ball bearings 32.

Thus there is no looseness of the pivoting means, with the result that the cutting disk 9 makes accurate cuts in the workpieces.

To remove the cutting head assembly 8, it is disconnected from the rod 75 by removal of the captive pin 77. The knobs 43 of the jackscrews 69 are then rotated to loosen the clevis members 45 of the hold-down means 43 and 44, whereupon they are again swung to the position as shown in FIG. 1 to release the bearing members out of the seat members 15 and 16.

The cutting head assembly may now be locked in a toolshed or other safe place, leaving the major part of the machine at the site of cutting operations.

What I claim and desire to secure by Letters Patent is:
1. A pivotal mounting for the cutting head of a masonry and like saw, which saw has a table-like work support carried on legs at the front and rear corners of the frame, said rear legs extending upwardly above the work support, a cutting head including a platform rotatably carrying a cutting disk on its forward end and a driving unit on its rear end, and said upper ends of the rear legs carrying therebetween a support for the cutting head, said pivotal mounting means including:
  a transverse shaft carried in lugs depending from the platform near the rear end and having ends projecting outwardly from sides of the platform,
  seat means on the support for the cutting head at outer sides of the platform and providing recesses,
  antifriction bearings fixed to said shaft in registering relation with the recesses and having outer peripheries engaged in said recesses to prevent lateral and fore-and-aft movement of the platform relatively to said support,
  and means pivotally carried by said support for the cutting head and having means removably engaging over the outer bearing members for clamping the outer bearing members rigidly in said recesses.

2. A pivotal mounting for the cutting head of a masonry and like saw, as described in claim 1:
and in which the cutting head support has openings extending therethrough below the seat members, and the pivotal mounting includes,
hinge pins shiftable within said openings of the support and provided with trunnions projecting from the openings,
clevis members having curved portions to engage over the outer peripheries of the outer bearing members and legs straddling said support and pivotally connected with the trunnions,
and jackscrews journaled in the support below the hinge pins and having shanks connected with the hinge pins to draw the curved portions of the clevises against the outer peripheries of the outer bearing members and to draw the outer bearing members into said recesses.

3. A pivotal mounting for the cutting head of a masonry and like saw, as described in claim 1:
in which the seat means are lugs fixed on the support for the cutting head at outer sides of the platform and provided with concavely arcuate recesses to seat lower portions of the bearings therein.

4. A pivotal mounting for the cutting head of a masonry and like saw, which saw has a frame, a cutting head supporting means on the frame, and a cutting head means, said pivotal mounting including:
means for removably pivoting the cutting head means upon said supporting means about a fixed pivotal axis which comprises,
seat members fixed to said supporting means and located in spaced apart relation along said pivotal axis and provided with recesses extending transversely of said axis,
a shaft carried by said cutting head means coaxially with said pivotal axis,
bearings having inner journal members fixed to said shaft in registering relation with the seat members and having outer bearing members snugly turning on the journal members and having outer peripheries engaged in said recesses of the seat members to prevent endwise movement of the shaft,
and means carried by said supporting means for removably clamping the outer bearing members rigidly in said seats, said supporting means including,
a bar carrying seat members rigidly fixed thereto and having openings therethrough near the seat members,
said clamping means having hinge pins shiftable within said openings of the bar and provided with trunnions projecting from the openings,
clevis members having curved portions for engaging over the outer peripheries of the outer bearing members and legs straddling said bar and pivotally connected with the trunnions,
and means carried by the bar at the seat members and having connection with the hinge pins to draw the curved portions of the clevises against the outer peripheries of the outer bearing members and the outer bearing members into said seats.

5. A pivotal mounting for the cutting head of the masonry and like saw, as described in claim 4,
wherein the clamping means are jackscrews having shanks rotatable in the bar and having threaded connection with the hinge pins to draw the curved portions of the clevis against the outer peripheries of the outer bearing members and the outer bearing members into said seats.

References Cited

UNITED STATES PATENTS

| 1,815,222 | 7/1931 | Swift. | |
| 2,401,500 | 6/1946 | Ockfen | 143—46 X |
| 2,513,643 | 7/1950 | Griner | 308—24 |
| 2,998,812 | 9/1961 | Cooper. | |

OTHELL M. SIMPSON, *Primary Examiner.*

U.S. Cl. X.R.

125—13